United States Patent [19]

Jocsak

[11] Patent Number: 4,760,856
[45] Date of Patent: Aug. 2, 1988

[54] METHOD AND APPARATUS FOR CONDITIONING FLY ASH

[75] Inventor: Richard W. Jocsak, Easton, Pa.

[73] Assignee: Fuller Company, Bethlehem, Pa.

[21] Appl. No.: 919,562

[22] Filed: Oct. 20, 1986

Related U.S. Application Data

[63] Continuation of Ser. No. 599,389, Apr. 12, 1984, abandoned.

[51] Int. Cl.$^4$ ............................................. B08B 3/04
[52] U.S. Cl. .................................. 134/56 R; 222/190; 73/302; 366/153
[58] Field of Search ............... 366/19, 153; 222/55, 222/59, 190, 195; 73/302; 134/18, 56 R, 201; 110/259, 165 A

[56] References Cited

U.S. PATENT DOCUMENTS

| | | | |
|---|---|---|---|
| 1,942,897 | 1/1934 | Lee | 134/18 |
| 2,331,208 | 10/1943 | Ludi | 73/302 |
| 2,640,977 | 6/1953 | Parisi | 73/302 X |
| 3,089,791 | 5/1963 | Stirling et al. | 134/6 |
| 3,144,176 | 8/1964 | Gronkvist | 222/195 |
| 3,373,753 | 3/1968 | Jacob | 134/18 |
| 3,419,015 | 12/1968 | Wochnowski | 134/18 X |
| 3,463,473 | 3/1976 | Borst | 73/302 |
| 3,655,518 | 4/1972 | Schmalfeld et al. | 202/118 |
| 3,734,834 | 5/1973 | Bricmont | 202/227 |
| 3,806,425 | 4/1974 | Ekholm et al. | 202/227 |
| 3,809,436 | 5/1974 | Ciaffone | 110/259 X |
| 3,840,436 | 10/1974 | Lorrek | 202/227 |
| 3,896,556 | 7/1975 | Welter | 202/227 |
| 4,239,421 | 12/1980 | Krauss | 222/195 X |
| 4,374,660 | 2/1983 | Sakhuja et al. | 65/27 |
| 4,413,758 | 11/1983 | Walters | 222/195 |
| 4,558,805 | 12/1985 | Margison | 222/59 X |

*Primary Examiner*—Philip R. Coe
*Assistant Examiner*—Frankie L. Stinson
*Attorney, Agent, or Firm*—Frank H. Thomson

[57] ABSTRACT

A method and apparatus for conditioning fly ash discharged from a silo to prevent the material from excessively dusting during discharge and transit to a storage or dump site. Apparatus includes a level box flow connected to the outlet of the silo with a modulating valve positioned between the outlet of the silo and the inlet of the level box for controlling the flow rate of material into the level box. The level box is a gas permeable bottom with air under pressure being passed upwardly through the material therein to aerate the material and improve flow characteristics of the material into an ash conditioner which is flow connected to the outlet of the level box. The ash conditioner is a conventional type including a rotating drum with an internal spray system for spraying water onto the ash to wet the ash. Wetted fly ash is relatively dust free when discharged from the conditioner. A bubble tube level sensor in the ash conditioner is used to control the valve controlling feed rate of material from the silo into the level box to maintain a substantially constant level of material in the level box and thus to the ash conditioner. The bubble tube is also used to control the quantity of water sprayed onto the material in the ash conditioner to avoid under or over wetting of the material. The method disclosed includes controlling the quantity of liquid applied to the fly ash as a function of the flow rate of material from the silo into the conditioner.

5 Claims, 3 Drawing Sheets

METHOD AND APPARATUS FOR CONDITIONING FLY ASH

This application is a continuation of our prior U.S. patent application Ser. No. 06/599,389, filed Apr. 12, 1984 and now abandoned.

BACKGROUND OF INVENTION

This invention relates to a method and apparatus for unloading bulk material such as fly ash from a vessel such as a storage silo while substantially preventing that material from dusting. More particularly, the invention relates to a fly ash conditioning apparatus or "dustless" unloader which is used in removing fly ash from a storage silo and emptying the fly ash into a truck or other disposal system for transit to a dump or other storage or use point. The material is wetted by applying water in a rotating drum ash conditioner. The present invention provides a method and apparatus for controlling the feed rate of material from the silo into the ash conditioner and controlling the quantity of water sprayed onto the material as a function of the rate of flow of material from the silo into the conditioner.

Prior to the present invention, ash conditioning systems utilizing water sprayed onto the ash are generally known. Ash conditioners of this type include a drum mounted for rotation about its own axis and mounted on an incline. The conditioner includes an inlet at its upper end for receiving dry ash discharged from the storage silo and a wetted ash outlet at the lower end of the conditioner. The conditioner includes an internal arrangement for spraying water onto the surface of material within the drum. As the drum is rotated, the ash tumbles down the length of the ash conditioner from its inlet to its outlet and the water spary wets substantially all of the material. The wetted material is then dumped into a truck or train hopper for transit to a dump or other use point. Due to the wetting of material, dusting of the material during the dump into the truck and transit in the truck is substantially reduced.

One of the major problems with prior ash conditioning systems is that the material may be over or under wetted. If the ash is wetted an inadequate amount, the intended purpose of reduction in dusting will not be achieved. If the ash is wetted too much, drainage and housekeeping problems result. Excess wetting of ash from western coal is a more severe problem than with ash from other coals in that the Western ash may contain materials which, if wetted above about 12% moisture, the ash becomes cementatious and will cling to virtually any surface, particularly inside the ash conditioner and associated equipment and the transport equipment. It is known that if ash from western coal becomes excessively wetted, it will set up in the ash conditioner and other places to such an extent that it must be removed by pneumatic hammers. At the same time, if the material is wetted to less than about 8% moisture, excessive dusting will occur during material handling and the purpose of using the ash conditioner will not be served. If is therefore, important to maintain the moisture content of Western coal ash between 8% and 12%.

Prior to the present invention, typically, the ash conditioner was close coupled to the outlet of the storage silo so that material is directly discharged from the silo into the ash wetting device. Water is supplied to the device at a steady rate. Fly ash will tend to set up in silos so that material discharge is not at a steady rate. Bridging of material across the walls of the silo can occur which results in material flow though the silo outlet being stopped. With a steady flow of water to the ash conditioner, a stoppage of material flow results in excessive wetting of material that is in the ash conditioner. When the bridge formed in the silo breaks, there will be a flush of material through the silo outlet into the ash conditioner. A steady flow of water into the conditioner will be insufficient to adequately wet the fly ash.

It is to be understood that method and apparatus of the present invention will not totally eliminate dusting of the fly ash when it is unloaded from the silo into the vessel. However, with a proper quantity of water applied to the fly ash, dusting will be substantially prevented even though some material dust is likely to still be present.

SUMMARY

It is therefore, the principal object of this invention to provide a method of unloading bulk material from a silo while substantially reducing dusting of that material.

It is another object of this invention to provide a method of unloading bulk material such as fly ash from a silo while reducing material dusting by adequately wetting the material yet avoiding the deleterious effects caused by over wetting of the material by applying water to the fly ash at a rate controlled by the rate at which material is emptied from the silo.

It is a still further object of this invention to provide an apparatus for unloading fly ash from a silo which applies a controlled quantity of liquid to the fly ash during the unloading process to wet the material in amounts sufficient to reduce dusting yet insufficient to permit the material to become cementatious.

In general, the foregoing and other objects will be carried out by providing a method of unloading bulk material from a silo while substantially preventing said material from dusting comprising the steps of providing a material conditioner having an inlet flow connected to the outlet of the silo and an outlet; supplying material from said silo to said conditioner; applying liquid to the material in the conditioner to wet the material; controlling the quantity of liquid applied to the material as a function of the rate of flow of material from the silo into the conditioner; and discharging wetted material from said conditioner.

The objects of this invention will also be carried out by providing apparatus for emptying fly ash from a silo comprising a container including an inlet flow connected to a silo to be emptied, means defining a gas permeable bottom including means for supplying gaseous fluid under pressure upwardly therethrough for aerating material in the container and an outlet; fly ash flow control means positioned between the outlet of the silo and the inlet of the container for controlling the rate at which fly ash can be discharged from the silo into the container; an ash conditioner including an inlet flow connected to the outlet of the container, means for applying liquid to the fly ash in the conditioner for wetting the fly ash and an outlet for wetted ash; means for sensing the depth of fly ash in the container; and means operatively connected to the means for sensing the depth of fly ash in the container for controlling the quantity of liquid applied to the material in the container.

The present invention utilizes a fly ash conditioner known per se in the prior art. This conditioner includes a rotating drum mounted at an angle for rotation about its own axis having an upper inlet and a lower outlet. Water is sprayed onto the ash within the ash conditioner to wet the ash. One of the difficulties with prior apparatus is the ability to control the amount of wetting which takes place within the ash conditioner. While it is relatively easy to control by means of a simple valve the quantity of liquid supplied to the ash conditioner, it is a difficult problem to control the rate at which material to be wetted is supplied to the conditioner. This is because the ash will tend to form clumps or bridge within the silo which prevents a smooth, steady flow of material from the silo to the conditioner. There may be periods when there is no feed of material to the silo and the constant feed of water causes an overwetting of material in the conditioner. When the bridge breaks, there will be a flush of material from the silo into the conditioner and the constant supply of liquid is inadequate to achieve proper wetting of the material.

With the present invention, a level control box has been positioned between the outlet of the silo and the inlet of the ash conditioner. This level control box includes a gas permeable bottom with a source of air under pressure supplied below the gas permeable bottom for flow upwardly through the bottom to aerate the material in the level box. The aeration or fluidization of material will tend to break up lumps and achieve a steady flow of material from the level box into the ash conditioner.

The rate of flow of material from the level box into the ash conditioner is a function of the depth of the material within the level box. As the head of material increases the rate of flow of material from the level box into the conditioner will increase, and as the head of material decreases the flow rate will decrease.

With the present invention, the depth of material in the level box is sensed and is used to control a modulating valve controlling flow of material out of the silo into the level box in an effort to maintain a constant depth of material within the level box. In addition, the level sensing device is used to control the quantity of water supplied to the ash conditioner. In this manner, the quantity of liquid applied to the material is controlled in response to the rate of flow of material to the conditioner to thereby permit the ratio of water to material to be controlled within a desired range. With a relatively constant rate of wetting of material, the percent moisture in the material can be controlled to thereby provide for adequate wetting to substantially reduce dusting during silo emptying but insufficient wetting to permit the formation of cementatious compounds.

BRIEF DESCRIPTION OF THE DRAWINGS

The invention will be described in connection with the annexed drawings wherein.

DESCRIPTION OF THE PREFERRED EMBODIMENT

Figure 1:
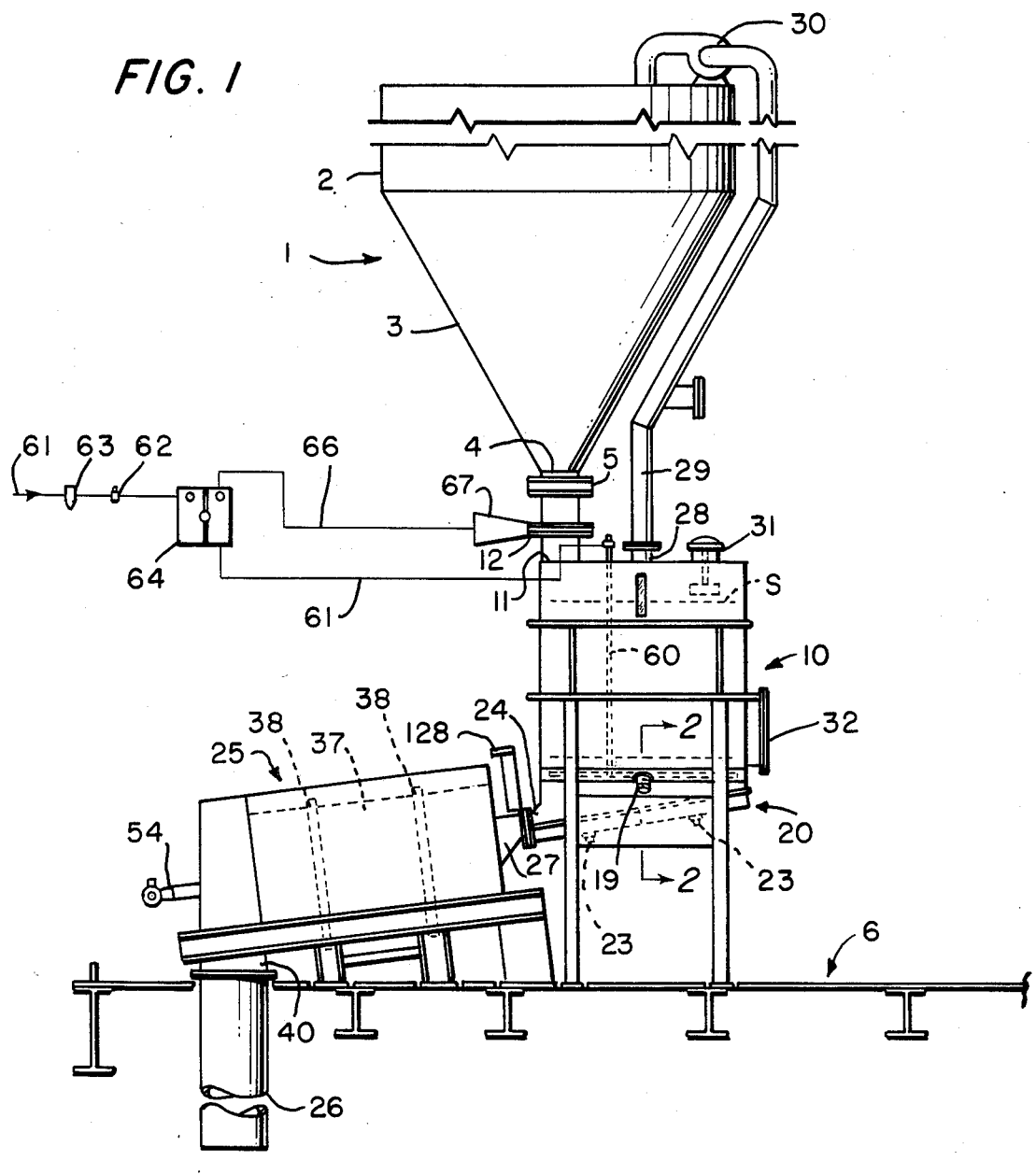
FIG. 1 is a view of the unloading apparatus according to the present invention.

Referring to FIG. 1, there is shown a vessel generally indicated at 1 for storing bulk particulate material such as fly ash which includes an upper cylindrical section 2 and a lower conical section 3 tapering to an outlet 4. An on-off valve 5 is positioned at the outlet of the silo and can be operated for example by means of a handwheel 5a. The purpose of the present invention is to provide a method and apparatus for unloading or emptying material from the silo 1 into a suitable transportation means such as a truck or railroad car (not shown) for transportation to a remote use or dump point. It is intended that during the unloading or emptying of this silo, the fly ash will be wetted to a desired amount to substantially reduce or prevent dusting of the material during the unloading operation yet not be wetted to such an amount that the material becomes cementatious or overly wet so as to form a slurry.

In order to carry out this purpose, the present invention utilizes a level box generally indicated at 10 in FIG. 1 and an ash conditioner generally indicated at 25 in FIG. 1 of a type known to the prior art. An outlet for the system is indicated at 26 in FIG. 1 at which point a truck or railroad car would receive the material. The entire system may be mounted on a suitable support system generally indicated at 6 in FIG. 1.

The level box or container 10 includes an upper inlet 11 flow connected to the outlet 4 of the silo 1. A modulating control valve of a type known in the art and generally indicated at 12 is positioned between the on-off valve 5 and the outlet 4 and the inlet 11 of the level box 10 for controlling the rate at which fly ash may flow out of silo 1 into level box 10.

Figure 2:
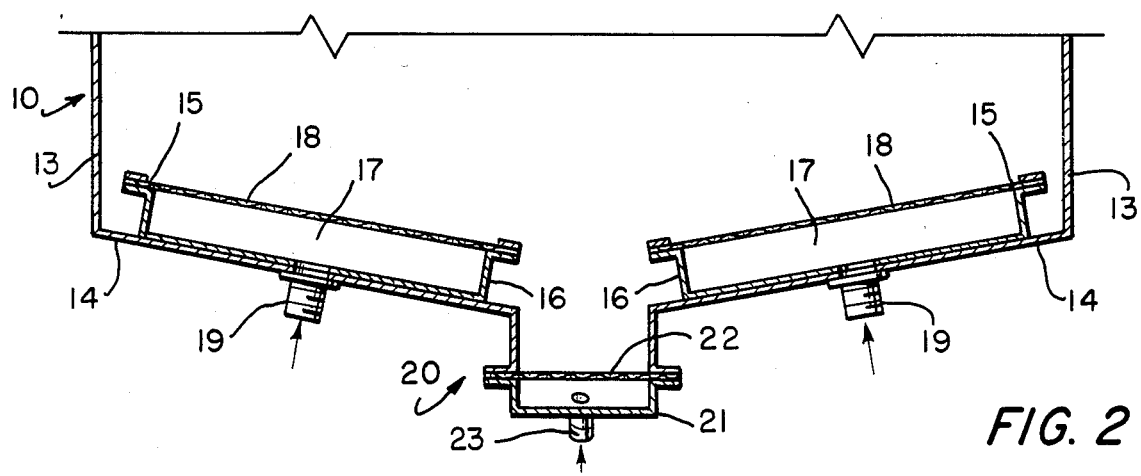
FIG. 2 is a sectional view on an enlarged scale taken on the line 2—2 of FIG. 1 showing the bottom of the level box of the present invention.
Figure 3:
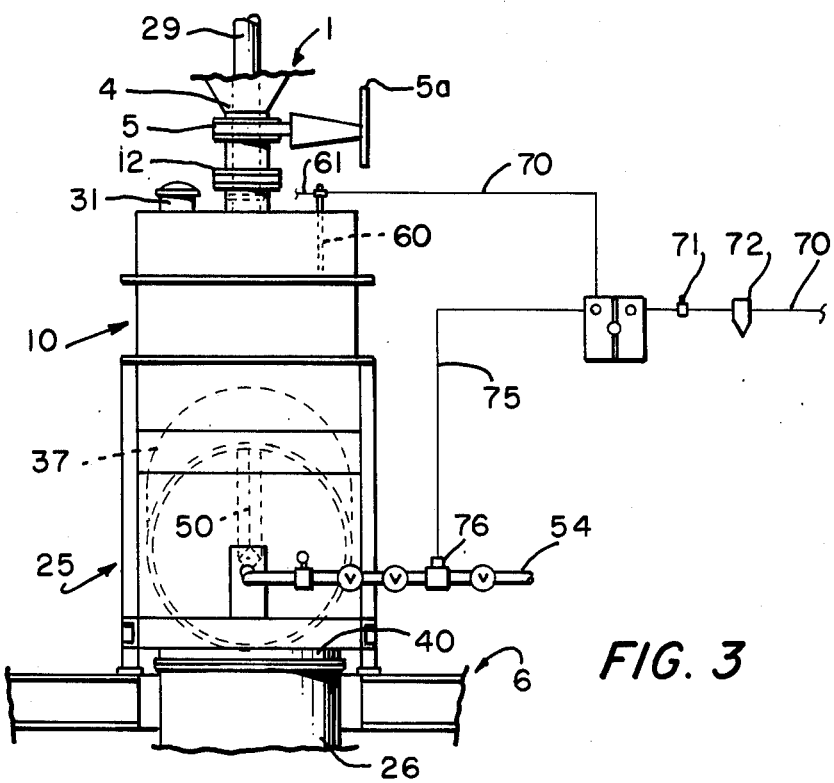
FIG. 3 is an end view of a portion of the apparatus shown in FIG. 1.

The level box 10 may be cylindrical in configuration including sidewalls 13 and a bottom 14. As shown in FIG. 2, the bottom 14 has aeration pads 15 mounted therein. These aeration units include a bottom 16 which defines a plenum chamber 17 and a gas permeable top 18 which defines a gas permeable bottom to the level box 10. The box 10 also includes means 19 for connecting the plenum chambers 17 to a source of air under pressure (not shown).

The level box 10 further includes a centrally positioned, downwardly sloping fluidizing gravity conveyor section generally indicated at 20 including a lower plenum chamber 21 and an upper gas permeable member 22. Gas under pressure is supplied to the plenum chamber 21 from a source (not shown) through conduit 23. Gas under pressure supplied to the aeration pads 15 flows upwardly through the gas permeable members 18 to fluidize or aerate material in the bin 10 so that it flows at a steady rate from the bin onto the fluidizing gravity conveyor 20. Gas under pressure supplied to plenum 21 from inlet 23 passes through gas permeable member 22 to fluidize material thereabove and in a manner known per se, the material flows along the length of the downwardly sloping conveyer 20 to the outlet 24 of the level box 10 to the inlet 27 of the ash conditioner 25.

The level box 10 has a vent 28 flow connected to a conduit 29 which is connected by means of a fan 30 to the top of the silo 1. In this manner, the level box 10 is essentially vented to atmosphere.

The level box also includes an upper level indicator 31 of the paddle wheel type. This level indicator may be connected to an alarm or to the on-off valve 5 to automatically close the valve and prevent over filling. A clean out port 32 may be provided in the side of the level box 10.

Figure 6:
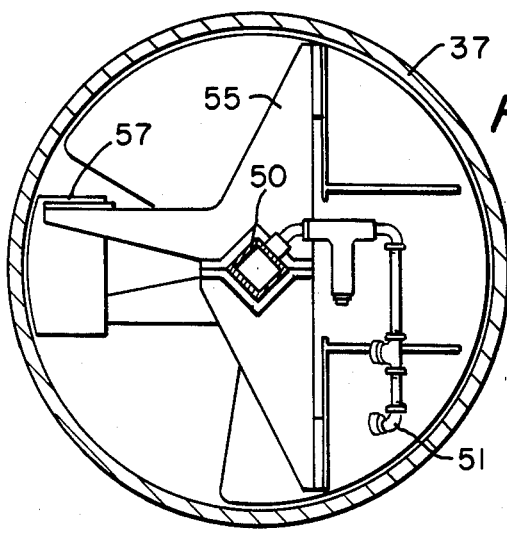
FIG. 6 is a sectional view of a portion of the material conditioner taken on the line 6—6 of FIG. 4.
Figure 5:
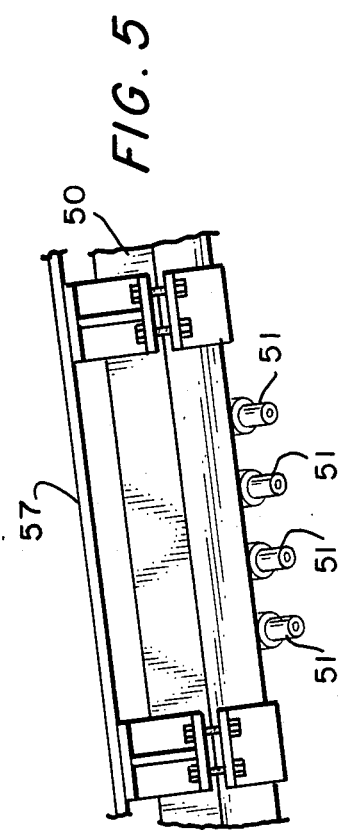
FIG. 5 is a detail of a portion of the conditioner of FIG. 4.
Figure 4:
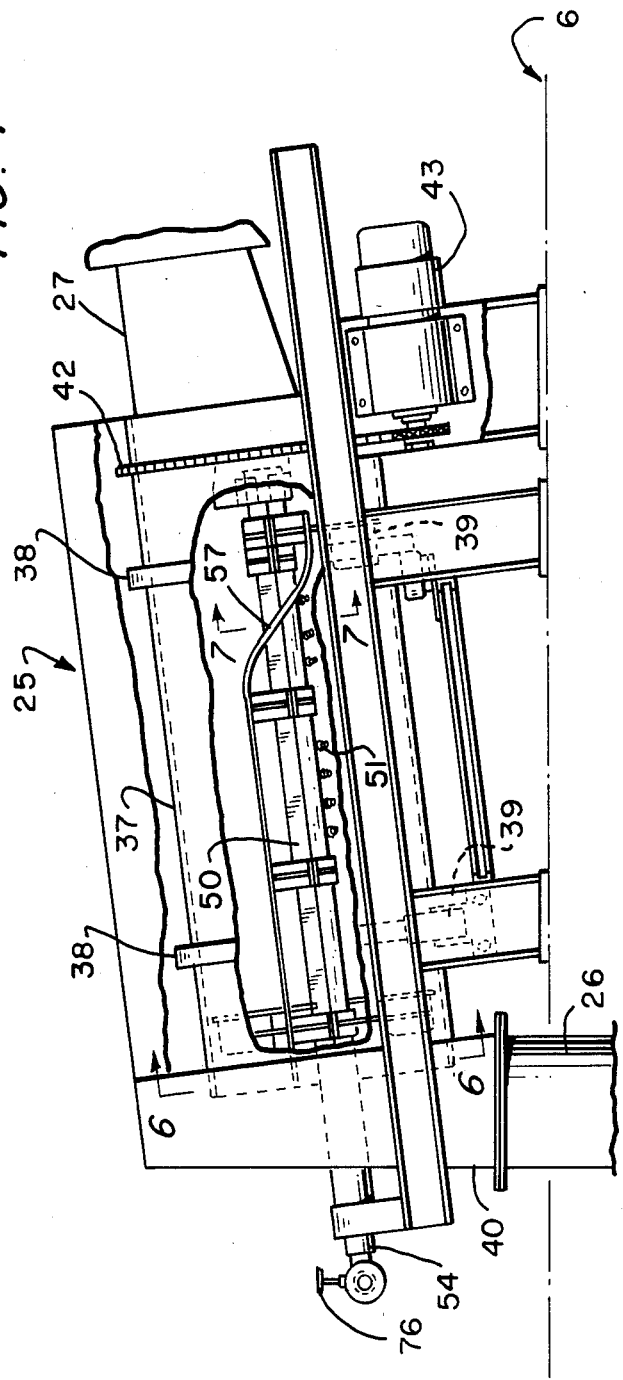
FIG. 4 is a view of the material conditioner utilized with the present invention with parts broken away to illustrate some of the internal components of the conditioner.

The ash conditioner 25 is shown in greater detail in FIGS. 4 to 6 and includes an inlet 27 flow connected to the outlet 24 of the level box 10. A suitable valve means 128 is positioned at the inlet 27 to shut off material flow out of container 10 into conditioner 25.

Referring to FIGS. 4 to 7, the ash conditioner includes a drum 37 mounted at an angle to horizontal for rotation about its own axis and includes the upper inlet 27 and a lower outlet 40 flow connected to the system outlet 26. The drum mounted on tires 38 and rolls 39 is rotated about its own axis by means of a chain and sprocket drive system generally indicated at 42 including a motor 43.

Figure 7:
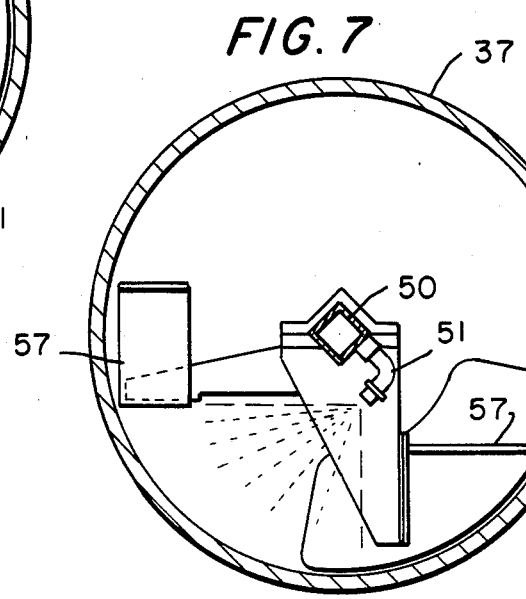
FIG. 7 is a sectional view of a portion of the ash conditioner taken on the line 7—7 of FIG. 4.

The ash conditioner 25 includes a hollow center tube 50 which is illustrated as being recetangular having a plurality of spray nozzles 51 mounted thereon communicating with the inside of the tube 50. Brackets mount the center tube 50 inside the ash conditioner in a suitable manner. Water under pressure is supplied from a source (not shown) through supply conduit 54 to the inside of the center tube 50. The water exists from center tube 50 through nozzles 51 and is sprayed onto the surface of material within the drum 37 as shown in FIG. 7.

The inside of the ash conditioner 25 includes a plurality of baffles such as the baffle 55 illustrated in FIG. 6 to create a tortious path for material passing through the conditioner from the inlet 27 to the outlet 40. This prevents material from flushing directly through the conditioner. The inside of the conditioner also includes a scraper 57 which is fixed in place but as the drum 37 rotates, material which may stick to the sidewalls of the drum are removed therefrom. As the drum 37 is rotated the material tumbles down the inside of the conditioner constantly turning over and being wetted by water spray being applied to the surface of the material.

The control method and apparatus of the present invention is provided primarily by the use of level box 10 and the measuring and control system associated therewith. By the present invention, means have been provided for measuring or sensing the depth of material within the level box 10 and this sensor, is used to control not only the feed of material to the level box and hence the ash conditioner but also the quantity of water supplied to the ash conditioner.

In the preferred embodiment, the level sensor takes the form of a bubble tube 60 which extends from the top of the level box 10 down towards the bottom thereof as illustrated in FIG. 1. A source (not shown) of air under pressure is connected through conduit 61 to the bubble tube 60. The conduit 61 includes a suitable pressure regulator 62 and filter 63. A controller 64 of a known type is flow connected to line 61 for sensing variations in air pressure in the line 61. Controller 64 is connected to an operator 67 by means of pneumatic control line 66. The operator 67 is used to control flow control valve 12 at the outlet 4 of silo 1/inlet 11 of level box 10. Thus, the valve 12 is operatively connected to the means 60 for sensing the depth of material in level box 10.

Air under pressure from line 61 is discharged from the bottom of the bubble tube 60. As the depth of material within the level box 10 increases or decreases, there is a corresponding increase or decrease in the pressure of the gas within conduit 61 and this variation in pressure is sensed by controller 64. In response to change in pressure in line 61, the controller 64 sends a signal through line 66 to operator 67 which controls or modulates the opening and closing of valve 12 to control the rate at which material may flow from silo 1 into level box 10. For example, if there is a decrease in the depth of material in the level box 10 there will be a decrease in pressure in bubble tube 60 and air line 61 which will be sensed by controller 64 which will actuate controller 67 through line 66 to further open valve 12 to increase the material flow rate out of silo into level box 10. Similarly, if the level of material in vessel 10 rises, there will be an increase in pressure in bubble tube 60 and air line 61 which will be sensed by controller 64 which will actuate controller 67 to close valve 12 to reduce the material flow rate out of silo 1 into level box 10. This control will serve to maintain within certain design parameters a substantially constant level of material within level box 10.

The fluidization of material within the level box 10 will maintain a steady flow of material from box 10 into the ash conditioner 25. The rate of flow of material from level box 10 into ash conditioner 25 will depend upon the depth of material within the level box 10, according to the following formulas:

$$Q = AV$$

where
Q is the flow rate
A is the area of the level box outlet opening 24
V is the velocity through opening 24
and $$V = \sqrt{gh}$$

where
V is the velocity
g is gravity
h is height of material from opening 24 to material surface S Since g and A are constant, the rate of flow of material out of level box 10 will vary as the height or depth of material in the container 10 above outlet 24 varies. If there is sticking of bridging of material within vessel 1, notwithstanding the modulating opening and closing of valve 12 based upon the depth of material in vessel 10 as sensed by the level sensor 60, there may not be a steady flow of material out of vessel 1 into level box 10. The aerated bottom of the level box will smooth out the flow of material to the ash conditioner but if the material does not get to the level box then the flow rate to the conditioner will decrease. If there is a decrease in the flow rate of material to the ash conditioner, a constant supply of water to the ash conditioner would result in excessive wetting of material within the conditioner. Similarly, if there is an increase in flow of material to the ash conditioner, a constant supply of water would result in insufficient wetting of the ash.

It has been discovered by the present invention that according to the aforesaid formula, because the rate of flow of material to the ash conditioner is a function of the depth of material within the level box, the depth of material can be used to control the quantity of water applied to the ash within the conditioner. Since the depth of material in level box 10 is a function of material flow rate out of silo 1, the quantity of liquid applied to the material is controlled as a function of the rate of flow of material from the silo into the conditioner.

The bubble tube 60 is also connected by a line 70 to a source of air under pressure (not shown) including filters and regulators 71 and 72 through a second control means 74. As the depth of material increases or decreases in level box 10, the controller 74 senses an increase or decrease in the pressure of the air in line 70 to control, through line 75, a suitable valve means 76 for controlling the quantity of water supplied to the center tube 50 of the ash conditioner 25 through water inlet 54 to thereby increase or decrease (depending on pressure) the quantity of water supplied to tube 50 and thus sprayed through nozzles 51 onto material within the conditioner 25. The means for supplying liquid to the conditioner is thus operatively connected to and controlled by the means 60 for sensing the depth of material in level box 10. The quantity of liquid applied to the material is controlled as a function of the depth of material within the level box 10 and since the rate of flow of material into the conditioner from the level box 10 in particular and broadly the rate of flow from the silo is a function of the depth of material, the quantity of liquid applied to the material is controlled as a function of the rate of flow of material from the silo into the conditioner. Since the bubble tube senses depth of material and material flow from the silo is a function of material depth, the bubble tube 60 serves as a means for sensing the rate of flow of material from the vessel 1 to the material conditioner 25, and the controller 74 and valve 76 serves as a means responsive to the means 60 for sensing the rate of flow for controlling the quantity of liquid supplied to the conditioner 25 and applied to the material in the conditioner.

It should be understood that while a bubble tube has been illustrated, other means for sensing the depth of material within the level box 10 could be utilized. It should also be understood that instead of using a single bubble tube 60 connected to two controllers 64 and 74 and two air sources 61 and 70, two separate tubes could be used, one for controlling valve 12 nd particulate material flow and the other controlling valve 76 and liquid flow.

From the foregoing, the method of the present invention should be clear. The method is carried out by providing a bin or level box 10 flow connected to the outlet of the silo 1 for receiving fly ash or other bulk particulate material through inlet 11 from the silo. The bin or box 10 includes an outlet 24. An ash conditioner 25 is provided having an inlet 27 flow connected to the outlet of the bin 10 nd having an outlet 40. Gaseous fluid, such as air under pressure, is passed upwardly through the fly ash into bin 10 for aerating the fly ash therein to assist the flow of ash from said bin into the ash conditioner. The level of material in the level box 10 is sensed by means of the bubble tube 60. The flow of fly ash from the vessel 1 into the bin 10 is controlled by valve 12 in response to the level of fly ash in the bin 10. Water is applied to the fly ash within the conditioner by spraying to wet the ash to thereby substantially prevent the ash from dusting when dicharged from the conditioner through outlet 26. The quantity of liquid applied to the ash through nozzle 51 is controlled in response to the level of fly ash in the bin 10. Wetted ash is discharged from the system through outlet 40 and 26.

The present invention is particularly directed for use with fly ash from Western coal which is particularly sensitive to the percentage of water applied to keep the ash from dusting. A water level of 8% is believed to be the minimum at which dusting will be effectively reduced. A water level in excess of 12% will result in cementatious compounds being formed. It is believed that the optimum is about 10%.

With the present invention, the ratio of the quantity of material to the volume of water within the ash conditioner can be effectively maintained between the critical percentages. Due to the fluidization of material in the level box 10, there will be a steady flow of material into the ash conditioner with the rate of flow dependent on the depth of material. If material flow rate from silo 1 to level box 10 becomes less than the flow rate from level box 10, the depth of material in level box 10 will decrease. This will be sensed by the bubble tube 60 and valve 12 will be openend further by controllers 64 and 67 allowing more material to flow into level box 10. At the same time controller 74 will close valve 76 to decrease liquid flow into the ash conditioner so that the ratio of fly ash to water is maintained relatively constant. Similarly, if material flow rate from silo 1 increases beyond the flow rate out of level box 10, the depth of material in level box 10 will increase causing an increase in flow rate of material to the conditioner 25. This depth increase will be sensed by the level sensor 60 causing a closing of valve 12 and an increase in water flow rate through supply conduit 54, central tube 50 and nozzles 51 to maintain water percentage relatively constant.

The flow rate out of the silo 1 may often remain relatively constant and there will be little variation in water flow rate. The invention is particularly useful when material bridges or sticks in silo 1 causing a drop or suspension of flow out of silo 1. With the prior apparatus, the suspension of material flow would mean a rapid reduction of material flow to the conditioner and consequently an over wetting of the material due to relatively constant water supply and the inability to rapidly compensate. This bridging of material in the silo is often followed by a rapid flush of material which with the prior apparatus meant that too much material was suddenly supplied to the conditioner and inadequate wetting occurred.

With the level box 10 of the present invention, these periods of reduced or stopped material flow and rapid flushing of material are evened out and the control system of the present invention controls water/material ratios to the desired level. Problems associated with material bridging and flushing are substantially eliminated.

From the foregoing it should be apparent to the objects of the present invention have been provided. A method has been provided for unloading or emptying a silo which includes wetting the material sufficiently to substantially reduce or eliminate dusting yet avoids applying so much water that cementatious and other deliterious compounds are formed.

It is intended that the foregoing be a description of a preferred embodiment and that the invention be limited solely by that which is within the scope of the amended claims.

I claim:

1. Apparatus for emptying bulk material from a vessel having an outlet comprising:

a material conditioner having an inlet flow connected to the outlet of a vessel to be emptied and an outlet for wetted material;

a level box positioned between the outlet of the vessel and the inlet of the material conditioner including an inlet for receiving material from the vessel and an outlet for discharging material to the conditioner;

means for supplying a liquid to the conditioner for wetting the material therein;

means for sensing the rate of flow of material from the vessel to the material conditioner including means for continuously sensing the depth of material in the level box;

valve means for controlling the flow of material from the vessel to the level box;

first controller means operatively connected to the means for sensing the depth of material in the level box and responsive to variations in the depth of material in the level box for controlling said valve means so that as the depth of material in the level box decreases, the valve means opens to permit an increase in the rate of flow of material from the vessel to the level box to maintain substantially constant the rate of flow of material from the level box to the conditioner; and second controller means operatively connected to the means for sensing the depth of material in the level box and responsive to the depth of material in the level box for controlling the quantity of liquid supplied to the conditioner so that the quantity of liquid supplied to the conditioner is responsive to the rate of flow of material from the vessel to the conditioner.

2. Apparatus for emptying bulk material from a vessel according to claim 1 wherein said level box includes means defining a plenum chamber having a gas permeable top which at least partially forms a bottom of the level box and means for supplying gaseous fluid under pressure to said plenum chamber for passage through the gas permeable top for aerating material in the level box.

3. Apparatus for emptying bulk material from a vessel according to claim 2 wherein said means for sensing the depth of material in the level box includes a bubble tube having means for supplying gaseous fluid under pressure thereto; and both said first controller means and said second controller means are responsive to the pressure of the gaseous fluid supplied to the bubble tube.

4. Apparatus for emptying bulk material from a vessel according to claim 3 wherein said valve means is a modulating valve for maintaining a substantially constant level of material in the level box.

5. Apparatus for emptying bulk material from a vessel according to claim 4 further comprising a second valve positioned between the outlet of the level box and the inlet of the conditioner and the level box is vented to the vessel.

* * * * *